… … … …

F6966   XR   2,746,958

United States Patent Office 2,746,958
Patented May 22, 1956

1

2,746,958

CELLULOSE DERIVATIVES AND THEIR METHOD OF PREPARATION

George H. Pyle, Crescent Hills, Va., assignor to Hercules Powder Company, Wilmington, Del., a corporation of Delaware No Drawing. Application May 17, 1951, Serial No. 226,933

14 Claims. (Cl. 260—232)

This invention relates to the treatment of cellulose derivatives and to the resulting products. In a specific aspect this invention relates to the treatment of cellulose ethers. In one of its more specific aspects this invention relates to a process for the bleaching and removal of color bodies from a cellulose ether by a novel bleaching process and to the resulting colorless cellulose ether.

Thermoplastic compositions based on ethyl cellulose and similar thermoplastic ethers of cellulose have been found to be useful where the properties of toughness, dimensional stability and flexibility are required. However, when such cellulose ethers have been molded into useful objects at high temperatures, a considerable discoloration of the cellulose ether composition takes place. Thus, compositions depositing a substantially colorless mass from solution have given relatively dark amber masses much like tortoise shell upon being molded under heat. In addition, there has been considerable loss of viscosity; i. e., degradation, leading to brittle molded products.

Some attempts have been made to improve color by treatment with various bleaching agents and by treatment with acids. Where such improvements in color have been retained in the molding operation, they have resulted in such extreme loss of viscosity that a relatively useless product results. As a result, it has not been possible to prepare clear colorless molded products of cellulose ethers or even to prepare molded cellulose ether articles in pale or pastel shades. Molded cellulose ether articles have therefore been made primarily in pigmented or dark colors.

It is an object of this invention to provide a novel process for treating cellulose derivatives.

It is another object of this invention to provide a novel process for treating cellulose ethers.

It is another object of this invention to provide a novel bleaching process for producing colorless cellulose ethers.

It is a further object of this invention to provide a novel process for producing colorless cellulose ethers of improved color stability.

It is a further object of this invention to provide a novel process for producing colorless cellulose ethers of low alkaline content and having improved viscosity and color stabilities.

It is another object of this invention to provide novel colorless cellulose ethers.

It is a further object of this invention to provide novel colorless ethyl cellulose of improved color stability and viscosity stability.

Further and additional objects of this invention will be readily apparent from the detailed disclosure.

In accordance with this invention it has been found that novel color stable and viscosity stable cellulose ethers can be prepared by a novel process for removing color bodies from the cellulose ethers. The novel product is

2 produced by contacting a cellulose ether composition with a chlorite bleaching agent in the presence of an aqueous swelling medium which penetrates the granules of and permits diffusion through the cellulose ether composition. After bleaching the cellulose ether in the presence of the aqueous swelling medium, the cellulose ether is stabilized with a phenolic stabilization agent, and the product, upon drying, is a colorless and color stable cellulose ether.

The following examples are illustrative of this invention.

*Example 1*

To 5000 ml. of aqueous 35% isopropanol was added 12 ml. of 1:1 hydrochloric acid. The dilute isopropanol was prepared from distilled isopropanol and distilled water. To the acidified aqueous alcohol was added 681 grams of ethyl cellulose. The pH of the mixture was 2.5. The ethyl cellulose contained 46.5% ethoxyl groups and when dissolved in a solvent consisting of 80 parts toluene and 20 parts ethanol, to give a 5% solution, the solution possessed a viscosity of 97 cps. at 25° C. The mixture of ethyl cellulose, swelling medium and acid was heated to 75° C. Then 3.0 grams of sodium chlorite dissolved in 400 ml. of 35% isopropanol was added. The mixture was maintained at 75° C. for 1.5 hours. Then the liquor was drained off. The volume was restored by the addition of 4000 ml. of fresh 35% isopropanol. After 0.5 hour, the liquor was drained off again. The volume was restored with 3000 ml. of fresh 35% isopropanol. This procedure was repeated five more times to wash the ethyl cellulose free of salts and the excess acid. Then to the last wash was added 5 grams of di-tert-amylphenol dissolved in 25 ml. of 35% isopropanol. The liquor was drained off and the material was vacuum dried.

The ethyl cellulose then was tested for plastics color stability by preparing a molding powder with the use of a two-roll mill with roll temperatures of 280° F. to 310° F. and rolling time of 20 minutes. The formulation consisted of ethyl cellulose, a methyl styrene plasticizer, and diisobutyl phenol in the ratio of 85:15:2. The colloided plastic was cut into pellets, dried for 2 hours at 100° C., and then injection molded at 410° F. into plastic disks with the use of a 1-ounce injection molding machine. The injection molded disks were 2¼ inches in diameter and 0.180 inch in thickness. The color or chromaticity and clarity or haze of the disks were measured with a photoelectric filter photometer. Apparatus suitable for measuring color or chromaticity is described by R. H. Osborn in U. S. Patent 2,382,439, and a similar device modified to permit the clarity measurements was used to measure the color and clarity of the treated and untreated ethyl cellulose. The color measurements are expressed in Cellulose Products Standard Color Scale (CSCS) units and the clarity is expressed in per cent haze. The color and clarity of air are zero with this measuring device, and the ethyl cellulose samples having the lowest color and per cent haze are the most desirable. The following data were observed:

|  | Color | Percent Haze |
|---|---|---|
| Ethyl cellulose product | 3.5 | 4.0 |
| Untreated ethyl cellulose | 18 | 9 |

*Example 2*

The procedure described in Example 1 was employed except that the bleaching with sodium chlorite was effected at room temperature instead of at 75° C., and the pH of the aqueous alcohol was adjusted to 2.9 with hydrochloric acid.

|  | Color | Percent Haze |
|---|---|---|
| Ethyl cellulose product | 4.1 | 4.0 |
| Untreated ethyl cellulose | 18 | 9 |

*Example 3*

The procedure described in Example 1 was employed except that the sodium chlorite bleaching was omitted, and the pH of the aqueous alcohol was adjusted to 2.2 with hydrochloric acid.

|  | Color | Percent Haze |
|---|---|---|
| Ethyl cellulose product | 4.3 | 5.1 |
| Untreated ethyl cellulose | 18 | 9 |

These data show that an ethyl cellulose of improved color can be obtained by contacting the ethyl cellulose with an acidified aqueous alcohol swelling medium, followed by stabilization of the ethyl cellulose, but when these data are compared with the data in Example 1, it is shown that a greater color improvement can be obtained by employing a chlorite bleaching agent with the swelling medium.

*Example 4*

To a glass container was added 2400 ml. of distilled water containing 1.5 grams of sodium chlorite. Then, 680 grams of ethyl cellulose containing 45.8% ethoxyl groups and having a viscosity of 79 cps. at 25° C. was added. Then, 2140 ml. of 85% isopropanol containing 5 ml. of 1:1 sulfuric acid was added. The mixture was heated to 75° C. and maintained at this temperature for one hour. The pH of this mixture was 2.2. The liquor was drained off and replaced with fresh 35% isopropanol. This was repeated to provide four more washes. The alcohol added for the last wash contained 6.8 grams of di-tert-amylphenol. The ethyl cellulose was vacuum dried and then tested as in the first example.

|  | Color | Percent Haze |
|---|---|---|
| Ethyl cellulose product | 3.7 | 4.8 |
| Untreated ethyl cellulose | 17 | 11 |

*Example 5*

A mixture of 1.36 grams of sodium chlorite, 1500 ml. of distilled water and 1000 ml. of 90% ethanol was placed in a glass container. To this mixture was added 680 grams of ethyl cellulose containing 45.8% ethoxyl groups and having a viscosity of 79 cps. at 25° C. Then a solution consisting of 1400 ml. 90% ethanol and 6 ml. 1:1 hydrochloric acid was added. This produced a slurry with a pH of 2.9. The mass was heated to raise the temperature to 75° C., and this temperature was maintained for 0.5 hour. The liquor was drained off and 2600 ml. of fresh 50% ethanol was added. After one hour the liquor was drained off again and 2600 ml. of fresh 50% ethanol was added. Three more washes were applied in this manner, the alcohol for the final wash containing 6.8 grams of di-tert-amylphenol. The ethyl cellulose was vacuum dried and tested as in Example 1.

|  | Color | Percent Haze |
|---|---|---|
| Ethyl cellulose product | 5.3 | 6.6 |
| Untreated ethyl cellulose | 17 | 11 |

The cellulose ethers that are employed in practicing this invention are organic solvent-soluble, i. e., they are soluble in any of the common organic solvents such as acetone, benzene, toluene-alcohol, methanol, ethanol, ethyl acetate, butyl acetate, and the like. The primary factor that determines whether or not a cellulose ether is organic solvent-soluble is the degree of substitution of the cellulose ether, and the extent of etherification necessary to produce an organic solvent-soluble cellulose ether is known to those skilled in the art. For example, ethyl cellulose having an ethoxyl content between about 37% and about 52%, preferably between about 43% and about 48%, and having a viscosity of at least 20 cps., is particularly suitable. One method of preparing such an ethyl cellulose involves the preparation of an alkali cellulose by contacting a celulosic materia with strong caustic. The resuting alkali cellulose is treated in an autoclave under pressure with an excess of ethyl chloride and the resulting mixture is then distilled to remove ether and alcohol by-products as well as unreacted ethyl chloride. The resulting ethyl cellulose is then water-washed. In addition to ethyl cellulose, other cellulose ethers can be treated in accordance with this invention. For example, the process is applicable to the bleaching of propyl cellulose, ethyl propyl cellulose, ethyl butyl cellulose, methyl ethyl cellulose, benzyl cellulose, and the like.

In addition to the alkyl and aralkyl cellulose ethers described above, the invention is generally applicable to organic solvent-soluble cellulose ethers. For example, ethyl hydroxyethyl cellulose can be treated in accordance with the invention to produce a color-free, color-stable product. Also ether-ester derivatives of cellulose can be treated in accordance with this process, but in these ether-ester derivatives the ether grouping is the dominant substituent and the ester grouping is present only in a minor amount. However, the degree of substitution of the ether-ester derivative is such that the derivative is soluble in the organic solvents named above. Throughout the specification and claims the term "cellulose ether" will be employed in the description of the invention. It will be understood that this term includes those ether-ester cellulose derivatives wherein the ether substituent is the dominant substituent and the ester substituent is present only in a minor amount as well as unesterified cellulose ethers.

Various aqueous media can be used to effect the desired swelling of the cellulose ether. For example, the swelling of the cellulose ether can be effected by aqueous digestion of the ether at an elevated temperature and pressure. Preferably the swelling is effected in the presence of an aqueous solution of an organic solvent for the ether, the concentration of the organic solvent in the solution being such that the cellulose ether is substantially insoluble in the solution. Organic solvents that can be used are acetone, dioxane, tetrahydrofuran, methyl acetate, ethyl acetate, and the like. The preferred organic solvents are the lower water-miscible aliphatic alcohols, for example, methanol, ethanol, propanol, isopropanol, and the like, with isopropanol being the most preferred organic solvent. In general, the aqueous solution of the organic solvent will contain from 10 to 50% by weight of the organic solvent. When isopropanol is the organic solvent, a concentration of 30 to 35% by weight is preferred, and when ethanol is used, the preferred concentration is within the range of 40 to 50% by weight. The treatment of the cellulose ether with the aqueous swelling medium results in a penetration of the ether granules by the swelling medium and in a deashing of the ether to remove inorganic constituents, such as alkaline metals, attached to functional groups in the cellulose ether and such impurities as iron, copper and low molecular weight organic materials. For effective deashing, a swelling medium which has been acidified until the pH is substantially below 6 and preferably within the range of 1.5 to 3.5 is employed. A pH higher than 3.5 can be used, but poor deashing of the cellulose ether results, and at a pH lower than 1.5 the cellulose ether has a tendency to degrade.

Either simultaneously with or subsequent to the deashing and swelling procedure the cellulose ether is treated with a chlorite bleaching agent. In Example 1 is described one method of effecting the bleaching treatment of the cellulose ether. In the method of this example the cellulose ether is first swollen and deashed with an acidic aqueous swelling medium, and the mixture resulting from the deashing step is heated to a temperature within the range of 50° to 100° C. A chlorite bleaching agent is added to the mixture, and the mixture is maintained at this temperature for a period of time sufficient to effect the desired bleaching. This period of time may vary from 0.25 to 5 hours, but it will be understood that temperatures and contact times outside these ranges can be used if desired. During the bleaching operation the pH of the mixture is maintained within the range of 1.5 to 3.5 for effective bleaching and deashing in order to obtain a substantially colorless and color stable product. In Examples 4 and 5 are described alternative methods of effecting the deashing and bleaching of the cellulose ether. In the method of Example 4 the cellulose ether was added to an aqueous solution of the bleaching agent, and an acidified aqueous swelling medium was added to the resulting mixture. The mixture, having a pH of 1.5 to 3.5, was maintained at a temperature of 50° to 100° C. for a period of 0.25 to 5 hours. In the method of Example 5 a mixture of water, bleaching agent and organic solvent was formed, and then a cellulose ether was added. Subsequently, additional solvent and acid were added to produce a mixture or slurry having a pH of 1.5 to 3.5. This mixture was then maintained at a temperature of 50° to 100° C. for a period of 0.25 to 5 hours to effect the desired treatment of the cellulose ether. Satisfactory results are obtained by employing any of the above-described procedures. The operating temperature is generally lower than the boiling point of the aqueous swelling medium, and the pressure is such that, at the operating temperature, the aqueous swelling medium is in the liquid phase.

The above examples describe the preferred conditions for carrying out the process, but operating conditions outside the preferred ranges can be used, if desired. For example, temperatures within the range of 0° to 130° C. and contact times within the range of 0.1 to 10 hours are within the scope of the invention.

The bleaching agent that is employed is a chlorite, preferably a metal chlorite, but nonmetallic chlorites, such as ammonium chlorite, can be used. The preferred metal chlorites are the metal and alkaline earth metal chlorites, for example, potassium chlorite, calcium chlorite, magnesium chlorite and most preferably sodium chlorite. The chlorite bleaching agent can be employed in various forms. For example, it can be used either in the solid form or in an aqueous solution containing from 1 to 25% by weight of the chlorite. The amount of chlorite that is employed is within the range of 0.1 to 2% by weight based upon the cellulose ether, but in most instances quantities in excess of 0.2% by weight are not necessary.

Various acidic materials can be employed to effect the desired pH adjustment in the deashing and bleaching operations. For this pH adjustment the inorganic acids are preferred, and the most preferred acids are the strong mineral acids such as hydrochloric acid, sulfuric acid, and nitric acid.

After the desired deashing and bleaching of the cellulose ether have been effected, the cellulose ether is separated and recovered from the resulting mixture. Suitable methods of recovering the cellulose ether are centrifuging, filtration, decantation or draining the solid cellulose ether from the accompanying liquid. The recovered cellulose ether is then washed with either water or additional amounts of aqueous swelling medium. The latter is preferred for the washing operation, and a series of washing steps is usually necessary in order to effect the removal of salts, excess acid and undesirable low molecular weight degraded cellulosic material. The washing is continued and it is considered complete when the pH of the effluent liquor from the washing step has a pH within the range of 4.2 to 4.8. Further washing of the cellulose ether may be used, but in most instances such further washing is not necessary. The resulting cellulose ether is substantially free of alkaline constituents and has an ash content not in excess of 0.02% by weight.

The cellulose ether resulting from the deashing and bleaching operations is subject to rapid oxidation and depolymerization upon exposure to heat unless properly stabilized. Therefore, during the washing of the bleached cellulose ether with aqueous swelling medium, a phenolic stabilizer is added to the cellulose ether in the last wash. Various phenols are suitable for effecting the desired stabilization of the deashed and bleached cellulose ether. Among these stabilizers are p-sec-ampylphenol, di-sec-amylphenol, o-sec-amylphenol, p-cyclohexylphenol, di-isobutylphenol, p-tert-amylphenol, menthylphenol, tert-butyl-p-cresol, methylene bis(tert-butyl-p-cresol), methylene bis-p-cresol, di(hydroxy methyl phenyl) methyl-p-cresol, and the like. In the specific examples di-tert-amylphenol was employed as a stabilizer. The amount of phenolic stabilizer employed to effect the desired stabilization is within the range of 0.5 to 1% by weight based on the cellulose ether. As indicated above, the phenolic stabilizer can be dissolved in the swelling medium that is employed as the last washing medium for the deashed and bleached cellulose ether, or alternatively a solution or dispersion of the phenolic stabilizer can be added to the mixture while the deashed and bleached cellulose ether is undergoing its last wash with swelling medium.

After deashing, bleaching and stabilizing the cellulose ether, the resulting cellulose ether is recovered by draining off the last wash liquid and drying the recovered cellulose ether. This cellulose ether can be processed into plastic products lighter in color than those possible heretofore. Also, a wide range of dyes can be used with this cellulose ether, and the resulting products are essentially free from odor. Prior to using the cellulose ether resulting from this process in a molding operation, it is preferred to add additional quantities of phenolic stabilizer in order to prevent oxidation or depolymerization of the ether. Preferably the resulting product contains from 1 to 3% by weight of phenolic stabilizer based upon the cellulose ether.

From the above disclosure numerous modifications and alternative methods of procedure within the scope of the invention will be apparent to those skilled in the art.

What I claim and desire to protect by Letters Patent is:

1. The method for removing color bodies from an organic solvent-soluble cellulose ether containing alkaline metal attached to functional groups in said cellulose ether which comprises contacting said cellulose ether with an inorganic chlorite bleaching agent in the presence of an aqueous swelling medium for said cellulose ether.

2. The method for producing a colorless ethyl cellulose which comprises forming a mixture containing an organic solvent-soluble ethyl cellulose containing sodium attached to functional groups in said cellulose ether and a swelling agent for said ethyl cellulose consisting essentially of an aqueous solution of a lower aliphatic alcohol containing from 10 to 50 weight per cent of said alcohol and acidified to a pH within the range of 1.5 to 3.5 with a strong mineral acid, said mixture being at a temperature within the range of 0° to 130° C. and below the boiling point of said aqueous alcohol solution, adding an alkali metal chlorite to the resulting mixture, and maintaining the thus-formed mixture at said pH and temperature for a period of time within the range of 0.1 to 10 hours.

3. The method according to claim 2 wherein isopropanol is the lower aliphatic alcohol.

4. The method according to claim 2 wherein the alkali metal chlorite is sodium chlorite.

5. The method according to claim 2 wherein from 0.1 to 2 weight per cent of the alkali metal chlorite based on the ethyl cellulose is employed.

6. The method for producing a colorless ethyl cellulose which comprises forming a mixture containing an organic solvent-soluble ethyl cellulose containing sodium attached to functional groups in said cellulose ether, a swelling agent for said ethyl cellulose consisting essentially of an aqueous solution of a lower aliphatic alcohol containing from 10 to 50 weight per cent of said alcohol, an alkali metal chlorite and sufficient strong mineral acid to produce a pH of said mixture within the range of 1.5 to 3.5, said mixture being at a temperature within the range of 0° to 130° C. and below the boiling point of said aqueous alcohol solution, and maintaining the thus-formed mixture at said pH and temperature for a period of time within the range of 0.1 to 10 hours.

7. The method according to claim 6 wherein isopropanol is the lower aliphatic alcohol.

8. The method according to claim 6 wherein the alkali metal chlorite is sodium chlorite.

9. The method according to claim 6 wherein from 0.1 to 2 weight per cent of the alkali metal chlorite based on the ethyl cellulose is employed.

10. As a composition of matter, a colorless cellulose ether composition, said composition having been prepared by contacting an organic solvent-soluble cellulose ether containing alkaline metal attached to functional groups in said cellulose ether with a metal chlorite in the presence of an acidic aqueous swelling medium for said cellulose ether.

11. As a composition of matter, a colorless ethyl cellulose composition substantially free of alkaline constituents and having an ash content not in excess of 0.02% by weight, said composition having been prepared by contacting an organic solvent-soluble ethyl cellulose containing sodium attached to functional groups in said cellulose ether with a metal chlorite in the presence of an acidic aqueous swelling medium for said ethyl cellulose.

12. As a composition of matter, a colorless ethyl cellulose composition substantially free of alkaline constituents and having an ash content not in excess of 0.02% by weight, said composition having been prepared by contacting an organic solvent-soluble ethyl cellulose containing sodium attached to functional groups in said cellulose ether with an alkali metal chlorite in the presence of an acidic swelling medium of an aqueous solution of a lower aliphatic alcohol.

13. The method for removing color bodies from a cellulose ether which comprises contacting an organic solvent-soluble cellulose ether containing alkaline metal attached to functional groups in said cellulose ether with a metal chlorite in the presence of an acidic aqueous swelling medium for said cellulose ether.

14. The method for removing color bodies from ethyl cellulose which comprises forming a mixture containing an organic solvent-soluble ethyl cellulose containing sodium attached to functional groups in said cellulose ether and an acidified aqueous swelling medium for said ethyl cellulose, and adding to the resulting mixture and contacting the ethyl cellulose with a metal chlorite.

References Cited in the file of this patent

UNITED STATES PATENTS

| | | |
|---|---|---|
| 2,138,757 | Collings | Nov. 29, 1938 |
| 2,238,912 | McHard | Apr. 22, 1941 |
| 2,358,866 | MacMahon | Sept. 26, 1944 |
| 2,535,290 | Ivett et al. | Dec. 26, 1950 |
| 2,535,360 | Koch et al. | Dec. 26, 1950 |
| 2,662,884 | Jenkins | Dec. 15, 1953 |

FOREIGN PATENTS

| | | |
|---|---|---|
| 561,834 | Great Britain | June 7, 1944 |